United States Patent

[11] 3,589,014

| [72] | Inventor | Stanley Horace Frederick Sarl<br>107 Brookside, East Barnet, Hertfordshire, England |
|---|---|---|
| [21] | Appl. No. | 608,634 |
| [22] | Filed | Jan. 11, 1967 |
| [45] | Patented | June 29, 1971 |
| [32] | Priority | Jan. 20, 1966 |
| [33] | | Great Britain |
| [31] | | 2,676/66 |

[54] SURVEYING INSTRUMENTS
4 Claims, 6 Drawing Figs.

[52] U.S. Cl. .................................................. 33/46, 33/74
[51] Int. Cl. ...................................................... G01c 15/12
[50] Field of Search ........................................... 33/46, 74 D; 356/138, 153, 154, 172; 350/288

[56] References Cited
UNITED STATES PATENTS

| 1,400,772 | 12/1921 | Schleth | 33/46 |
| 2,570,458 | 10/1951 | Kowalczyk | 33/46 X |
| 2,834,111 | 5/1958 | Sweany | 33/46 |

FOREIGN PATENTS

| 240,426 | 11/1925 | Great Britain | 33/46 |
| 968,640 | 9/1964 | Great Britain | 33/46 |

*Primary Examiner*—Harry N. Haroian
*Attorney*—Cushman, Darby and Cushman

ABSTRACT: A surveying instrument having two separable elements which can be disposed relative to other structures and manipulated to ascertain and adjust the orientation of such structures. A mirror having a pattern with a plurality of extending arms is mounted on one of the elements and the other element has an aperture through it and a similar pattern, about twice the size of the pattern on the mirror, on its underside. When the elements are exactly aligned, the reflected image of the pattern on the underside of the one element as viewed through the aperture coincides with the viewed pattern on the mirror.

PATENTED JUN29 1971

INVENTOR
Stanley, Horace Frederick Sarl
BY
Cushman, Darby & Cushman
ATTORNEYS

SURVEYING INSTRUMENTS

This invention relates to improvements in surveying instruments.

In my British Pat. specification No. 968,640 there is claimed a surveying instrument comprising an open-topped box provided with a detachable lid, a mirror being adjustably mounted substantially horizontally in the box and having a spirit level or levels on its mounting to enable it to be adjusted into a truly horizontal position, when the box is rested on a substantially horizontal surface, the lid having a target thereon of identical shape to that of the mirror and having linear dimensions twice those of the mirror, the target having an aperture substantially centrally therein, which aperture also passes through the lid.

In my British Pat. specification No. 968,640, the target is shown and described as a pattern positioned about a central aperture therein and is designed to assist the use in lining up this aperture with a central opaque spot on the mirror.

In practice it has been found that this arrangement is difficult to operate and does not provide for correct orientation of the target with the mirror.

The present invention seeks to provide a surveying instrument of the same general type as that of my said British patent but which is easier to operate accurately and provides for correct vertical and angular and provides for correct vertical and angular orientation of the target and mirror.

According to the invention a surveying instrument comprises an open-topped box having at least one flat side, a detachable lid for the box defining a central aperture, a mirror supported by the box, level-indicating means associated with the mirror to determine the orientation of the mirror with reference to the horizontal, means applied to the underside of the lid to constitute a pattern arranged radially with respect to the aperture and establishing rotational orientation of the lid above the axis of the aperture, and nonreflective means applied to the mirror to constitute a similar pattern establishing orientation in the same manner as that of the lid and comprising in addition a target corresponding to the aperture the whole of such pattern being of half the size of that of the lid.

The pattern on the lid is preferably arranged in two contrasting colors which may well be black and white.

How the invention may be carried out will now be described by way of example only and with reference to the accompanying drawings, in which.

Figure 1:
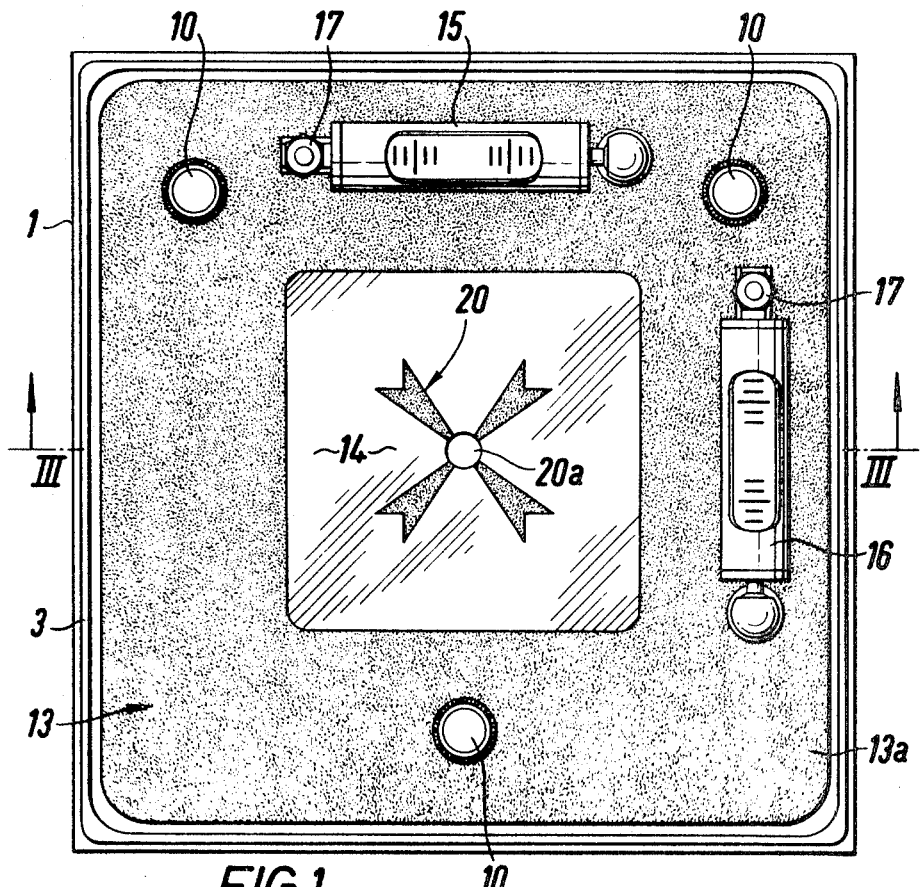
FIG. 1 is a plan view of the open-topped box in which the mirror is mounted.
Figure 3:
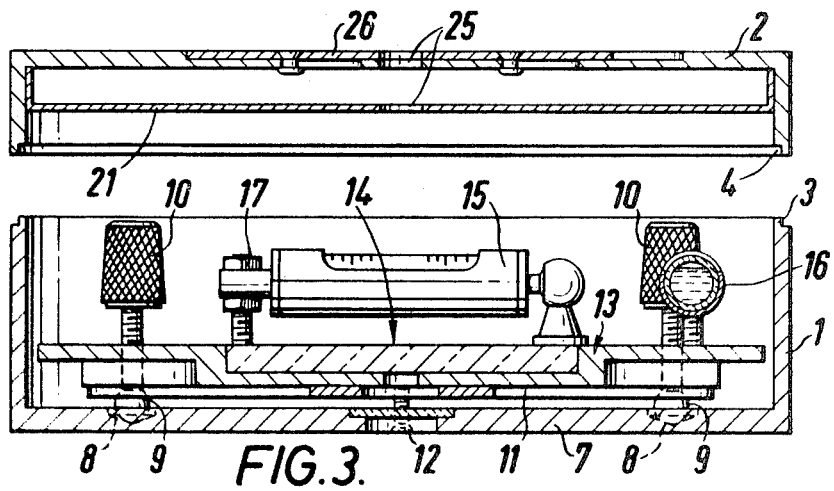
FIG. 3 is a cross-sectional side elevation of the instrument taken on the line III—III of FIG. 1 in position above the box.
Figure 2:
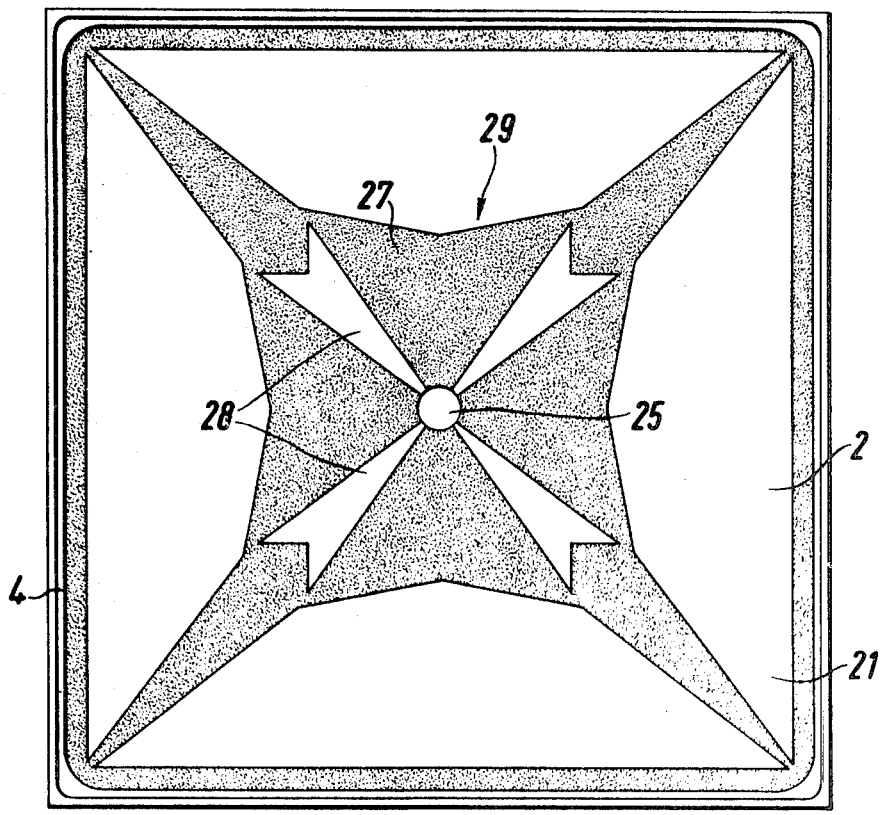
FIG. 2 is a plan view of the underside of the lid of the box.

Referring to FIGS. 1 to 3, the instrument comprises an open-topped box 1, of about 4"×4"×1a-:: and having a lid 2 which fits thereon and is located in position by a lip 3 on the box 1 which sits in a correspondingly shaped recess 4 in the bottom edges of the sides of the lid 2.

The base 7 of the box is provided with three indentations 8 to support balls 9 on three adjusting screws 10. The balls 9 are retained in their indentations by a three-arm member 11 screwed to the base 7 at 12. Supported by the screw threads of the screws 10 is a table 13.

A flat substantially square mirror 14 is carried by the table as are also two spirit levels 15 and 16. Each spirit level is adjustable at one end 17 so that the mirror may be calibrated to be horizontal when the spirit level bubbles are central. Then, when the instrument is in use, the spirit levels 15 and 16 can be set by the use of the screws 10 and the mirror will automatically be horizontal.

The mirror 14 has a star-shaped target 20 marked thereon with a circular portion 20a at the center of the mirror. This star-shaped target 20 is preferably black and may be formed by placing a black appropriately shaped material on top of the mirror or by removing the silvering from the back of the mirror and providing a black background. If desired, a piece of transparent material having an opaque portion in the form of the target may be placed on the mirror instead of attaching the target thereto. The circular portion is however preferably transparent so that the surface on which the base rests may be seen.

The lid 2 has a portion 21 of the same shape as the mirror 14 but of twice the size i.e. having twice the linear dimensions. This portion 21 is provided with an aperture 25 in the center thereof which passes right through the lid 2. A sliding cover 26 is provided for the aperture (FIG. 2). The aperture 25 corresponds with the circular portion 20a on the mirror. The portion has marked thereon a target indicated generally at 29 and consisting of a black area 27 having white portions 28 thereon corresponding to the arms of the star-shaped target 20 on the mirror. These white portions are once again twice the linear dimensions of the star-shaped target 20.

Figure 5:
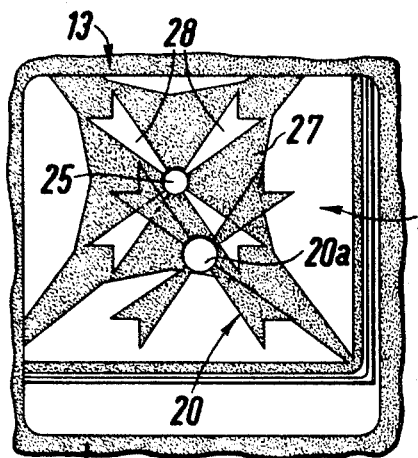
FIG. 5 is a view of the mirror showing the image therein when the lid is not vertically above the box.
Figure 6:
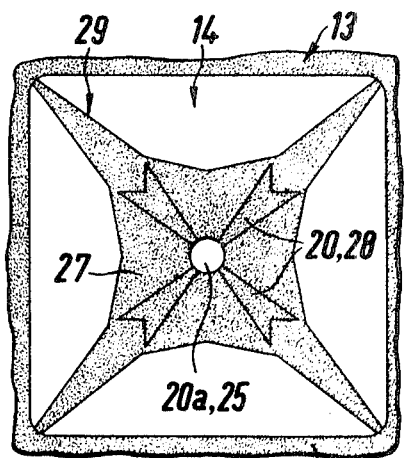
FIG. 6 is a view similar to FIG. 5 but showing the position when the lid is vertically above the box.

The arrangement of the target on the lid is such that when the mirror is viewed through the aperture 25 and the aperture 25 is vertically above the circular portion 20a on the mirror, the viewed black area 27 of the target appears totally black as is seen in FIG. 6, the black portions of the mirror 14 completely blacking out the white portions of the target 29. If, however, the aperture 25 is not above the circular portion 20a of the mirror, the white portions of the target 29 will be visible as shown in FIG. 5.

The area 13a of the table 13 surrounding the mirror 14 is preferably colored black in order to show up the mirror 14 when it is viewed from a distance of up to, say, 40 feet.

Various modifications could be made to the aforedescribed instrument. For example, although the targets have been described as using the colors black and white, it is to be understood that other colors of appropriate contrast could be used. Where desired, the black portion 27 of the target 29 could be in a first color and the colors of the target 20 and the portion 28 of the target 29 could, when viewed together, achieve the same color as the portion 27, thus providing the same effect as the black and white arrangement. Although the targets have been described as having a star shape, the targets could be of any required shape or shapes and could provide that not only will the lid be aligned squarely over the mirror but also that the lid can be so angularly oriented that a particular side of the lid could be arranged vertically over a particular side of the box. In this case, the targets would either not be symmetrical or would be symmetrical but eccentrically placed.

The adjustable mounting for the table 13 could take various alternative forms, such as by using a ball and socket or a gimbal type of suspension with clamps, or by freely suspending the table 13 and having suitable clamping means to prevent excessive swinging of the table.

The two straight spirit levels shown could be replaced by a circular spirit level.

The box, lid, target and mirror could be of a different shape from that shown, provided that the target is the same shape as the mirror and has linear dimensions twice those of the mirror.

The box and lid may each be provided with an extensible rule 4 inches long, which can be extended in order to enable the box or lid to be spaced a known distance from a wall, for example, in order to facilitate sighting of the instrument in the following described manner.

One or both portions of the target on the lid could be translucent or one of the portions could be transparent. The lid may be provided with its own illumination either internally so as to illuminate the translucent or transparent portions or externally so as to illuminate the target surface.

Figure 4:
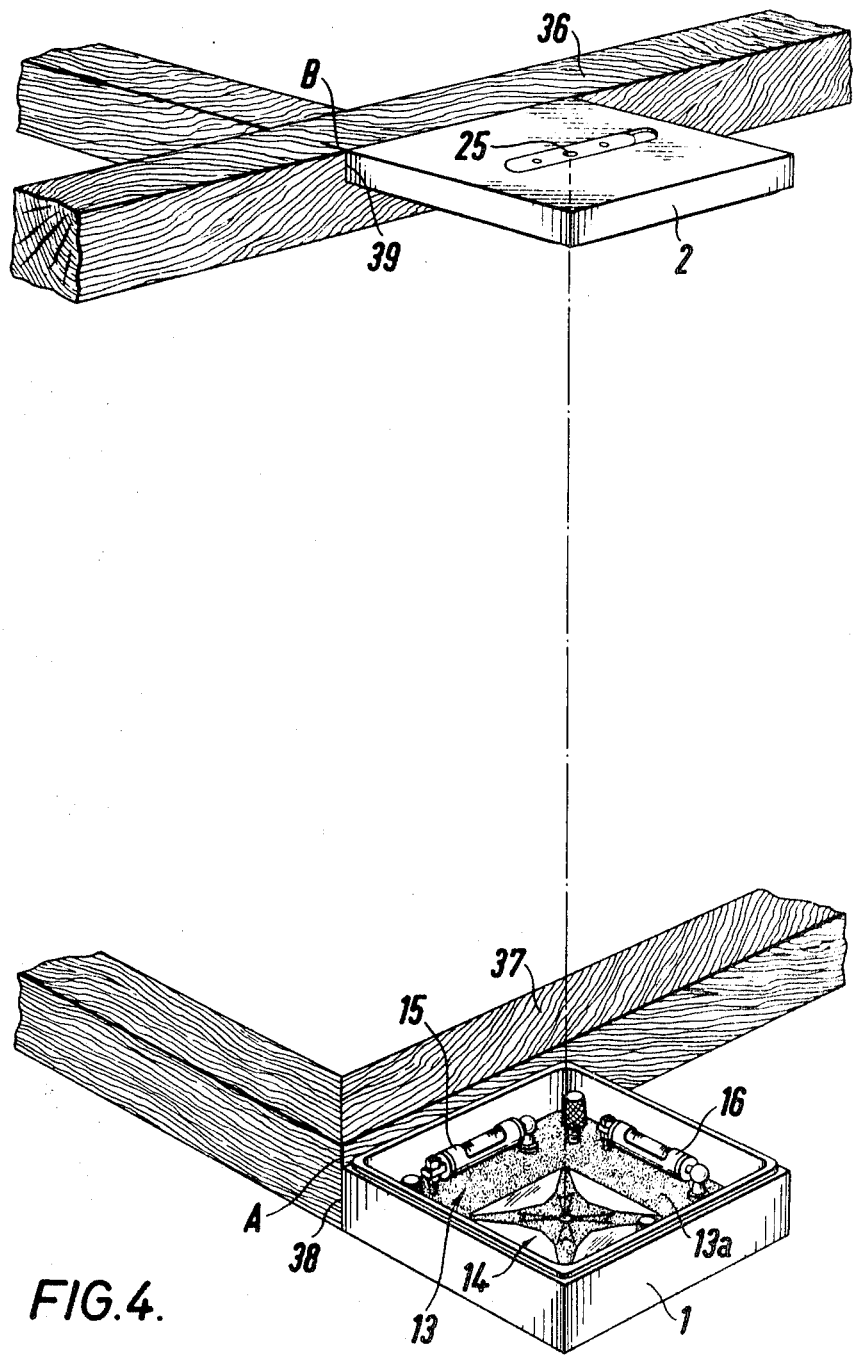
FIG. 4 is a diagrammatic representation of one way in which the instrument of the invention can be used.

One application of the instrument of the invention will now be described with reference to FIG. 4 which shows how one point can be set vertically above another.

For example, if it is desired to mark a point on a first beam 36 to be exactly above a point A on a second beam 37, which itself is exactly below the first beam 36, then the box 1 is placed in a substantially horizontal position with one corner thereof, indicated by 38, adjacent the point A.

The mirror 14 is then adjusted until it is truly horizontal as indicated by the spirit levels 15,16.

The lid is then held in the hand adjacent the beam 36 in a substantially horizontal position and with the target 29 facing downwards. The operator then views the mirror 14 through the aperture 25 in the lid and manipulates the lid 2 until he can seen the image of the target 29 in the mirror 14. He will then see an image somewhat similar to FIG. 5. The lid should then be finely manipulated so that the white portions 28 of the target 29 are obscured by the black target 20 when the image will appear as in FIG. 6. This will ensure that not only is the aperture 25 above the center of the mirror 14 but also that the sides of the lid are parallel to the sides of the box. All points on the lid will then be vertically above the corresponding points on the box. Thus the corner 39 of the lid 2 indicates a point B that is vertically above the point A.

The target 29 may be painted with or formed from a luminescent substance so that its image can then be seen when the instrument is used in a place where there is little light.

The invention provides an instrument which is compact and lighter in weight than an ordinary plumb bob and therefore easy to carry in a jacket pocket, for example.

The instrument is also simple in use and does not require any special support or mounting such as a tripod.

I claim:

1. A surveying instrument having two separable elements for vertically aligning one of said elements with the other of said elements while causing said elements to assume the same angular orientation in their respective horizontal planes, said instrument comprising:

a first element having at least one flat side and a horizontal supporting surface, a mirror having the surface thereof supported on said supporting surface of said first element, level-indicating means associated with said supporting surface for side the relationship of the surface of said mirror to the horizontal, a second element having at least one flat surface and a horizontal surface with means therein defining an aperture through the center of said surface, said second element adapted to be placed in a vertical spaced relationship to said first element with each of said surfaces being in substantially parallel planes and with said mirrors facing said second element, first pattern means applied to the side of said second element surface facing said first element, said first pattern means having a first white portion including radial arms extending from said aperture for indicating the angular orientation of said second element in a horizontal plane and a second black portion surrounding said first portion, and second black pattern means applied to said mirror, said second pattern means being of the same shape as said first portion of said first pattern means, but the size of said second pattern being half the size of said first portion so that when said elements are vertically aligned and in the same angular orientation, said second black pattern means completely overlays and covers up said first white portion of said first pattern means and accordingly all the area within said second portion appears black as viewed through said aperture.

2. The surveying instrument defined in claim 1 wherein said first element is an open-top box and said second element is a lid member adapted to fit over said open-topped box.

3. The surveying instrument defined in claim 1 having in addition an adjustment means for adjusting the position of said horizontal surface on said first element with respect to the horizontal.

4. The surveying instrument defined in claim 1 wherein said first and second pattern means are in the shape of a four-armed star with the arms extending radially from the center thereof, the length of said arms of said second pattern means being half the length of the arms of said first pattern.